Patented Aug. 28, 1945

2,383,752

UNITED STATES PATENT OFFICE 2,383,752

CHEMICAL PROCESS

Michael Sveda, Cleveland, Ohio, assignor to E. I. du Pont de Nemours & Company, Wilmington, Del., a corporation of Delaware No Drawing. Application February 17, 1943, Serial No. 476,210

10 Claims. (Cl. 260—513)

This invention is directed to processes for the reaction of paraffin hydrocarbons with sulfur trioxide in the vapor phase and to the products produced.

It is an object of the invention to produce novel products from paraffin hydrocarbons. It is a further object of the invention to provide processes for the production of such products from paraffin hydrocarbons. Still further objects will become apparent hereinafter.

The foregoing and other objects of this invention are attained by effecting reaction between sulfur trioxide and a paraffin with both of the reactants in the vapor phase. As soon as a desired reaction product has been obtained it is withdrawn from the reaction zone and, preferably, cooled to prevent still further reaction and to prevent the production of undesirable decomposition products. The reaction may further be controlled as set out more fully hereinafter by the use of diluents, by control of the temperature and duration of reaction, and by manipulation of other similar process.

Products of this invention may be made using any paraffin hydrocarbon having at least three carbon atoms. Normally gaseous hydrocarbons such as propane, butane, isobutane, and neo-pentane may very readily be used since no provision need be made for vaporizing these materials. Hydrocarbons which are not gaseous at room temperatures such as iso-pentane, normal butane, normal hexane, iso-hexane, 2,2-dimethyl butane, and 2,3-dimethyl butane, 3-methyl pentane, and higher molecular weight hydrocarbons may be used but they will need to be vaporized before they are brought into contact with sulfur trioxide.

Gaseous sulfur trioxide for use in reactions of the present invention may be obtained from any source and there may be employed, for instance, the pure sulfur trioxide vapor obtained by heating liquid sulfur trioxide or solid sulfur trioxide or that obtained by heating oleum. The sulfur trioxide-containing mixture of gases obtained from commercial contact converters may similarly be used. If a converter gas is used, care must be exercised to avoid explosive concentrations of hydrocarbons since otherwise an explosion may result from the presence of residual oxygen in the converter gas. To avoid this danger the reaction between the hydrocarbon and the sulfur trioxide may be carried out at a rate in excess of the velocity of the explosion wave caused by the reaction of the residual oxygen and the hydrocarbon. Alternatively, the oxygen in the converter gas may be removed or may be burned with hydrogen or carbon prior to use of the gas mixtures for the purposes of the present invention.

The primary products obtained contain sulfonic acid or sulfonic anhydride groups, sulfone groups, and sulfate groups. Compounds containing carbonyl and carboxy groups are also formed to a minor extent. The products may generally be designated as aliphatic polyhydroxy sulfonic acids which are at least partly esterified with sulfate groups, that is, aliphatic hydrocarbon compounds which contain —$SO_3H$ and —$OSO_2OH$ groups. Upon dissolving the products in water, according to preferred practices of the invention, hydrolysis results and there are obtained the free polyhydroxy sulfonic acids. These may be more specifically described as polyhydroxy polysulfonic acids containing sulfone groups. While reference is made to the acid, it will be understood that it will frequently be found desirable to isolate the product in the form of a salt of a suitable metal such as barium, cadmium, or sodium, or of ammonia or a substituted ammonia.

The products of this invention will be found useful as electrolytes and as addition agents for electroplating. The ammonium salts will also be found suitable for use as flameproofing agents for the treatment, for instance, of cellulosic articles. They may be used as tanning assistants.

Processes of this invention involve, broadly, bringing together a paraffin hydrocarbon and sulfur trioxide with both in the vapor phase and under conditions which will promote a controlled reaction. After the reaction has continued to a desired extent the products of reaction are withdrawn and the reaction terminated by cooling the product. The conditions of the reaction will be more fully discussed under the following headings:

Proportions of reactants

The proportion of reactants can easily be adjusted by regulating the relative rates of flow of the paraffin hydrocarbon vapor and the sulfur trioxide vapor. The proportions of the two reactants will ordinarily need to be carefully regulated depending upon the particular product which it is desired to produce. The amount of sulfur trioxide should ordinarily be substantial and sufficient to insure a maximum yield of the product desired, but it is not ordinarily desirable to use an excess of sulfur trioxide since this excess may contaminate the product and may even cause considerable decomposition of the product if it is collected together with unreacted liquid sulfur trioxide. There is ordinarily no disadvantage in the presence of an excess of paraffin hydrocarbon save as the hydrocarbon contaminates the product. Where products containing relatively high amounts of sulfur are desired it would of course be undesirable to have any considerable excess of hydrocarbon present.

Diluents

The reaction between a paraffin hydrocarbon and sulfur trioxide may to a considerable extent be modified by the inclusion of a gaseous diluent. Thus the rate and intensity of reaction may be diminished without changing the proportions of reactants. Various inert diluent gases may be used and there may be employed, for instance, sulfur dioxide, nitrogen, or carbon dioxide. As has been indicated above, a converter gas may be used as a source of sulfur trioxide and this gas is already dilute.

Temperature of reaction

The temperature in the reaction zone should be maintained above the boiling point of the sulfur trioxide and the paraffin hydrocarbon to be reacted, though temperatures below the boiling point of sulfur trioxide may be used if diluents are employed. The upper limit of the temperatures employed depends upon such factors as the thermal decomposition point of the hydrocarbon to be reacted, the thermal decomposition point of sulfur trioxide, and the thermal decomposition point of the product desired. The reaction may be performed at a temperature above the thermal decomposition point of the product to be produced in order to accelerate the reaction but in this event the reaction products should quickly be removed from the reaction zone and cooled before they have a chance to undergo extensive decomposition. Temperature control can readily be accomplished by indirect heat exchange when it is desired to add or remove heat from the reaction zone, and if it is desired to initiate the reaction at a comparatively high temperature heat may be added either by separately preheating the reactants to a desired degree or by a preliminary indirect heat exchange of a mixture of the reactants as they pass to the reaction zone.

Generally, low reaction temperatures are conducive to sulfonation while higher temperatures lead to less sulfonation and to a greater degree of oxidation. I have also observed that higher reaction temperatures lead to some dimerization and sometimes to an even greater degree of polymerization.

Duration of reaction

The length of time that the reaction should be allowed to continue depends upon such factors as the concentration of the gases, the temperature of reaction, and the exact nature of the hydrocarbons being treated. After a desired product is produced it will ordinarily be found very desirable to remove the product from the reaction zone and cool it. A product formed may suitably be cooled, for instance, by withdrawing it into a receptacle provided with indirect heat exchange. Cooling may, instead, be effected by running the product into a cold fluid such as water or aqueous alkaline solutions containing sodium hydroxide, potassium hydroxide, barium hydroxide, calcium hydroxide, and the like.

A wide range of products may be made according to the processes of the present invention and the specific character of the product of a particular process will depend upon the specific conditions of reaction. Thus if the duration of reaction is increased products of one character will be produced which are different from those produced in a shorter period under otherwise similar conditions. The duration of reaction thus becomes an important factor in determining the precise character of product. The time of reaction will ordinarily vary from a tenth of a second or so up to a few minutes though in each particular instance the time of reaction can best be determined by a few simple trials.

Pressure

Reactions of the present invention may be performed at pressures other than atmospheric to vary the conditions of reaction. Catalysts may be used if desired.

In order that the invention may be better understood reference should be had to the following illustrative examples:

Example I

Sulfur trioxide and propane were brought together using a reaction tube 16 mm. inside diameter heated for a length of 500 mm. The reaction tube contained a thermocouple leaving an effective heated volume of 90 cc. The reaction conditions were as follows:

Rate of sulfur trioxide flow____ 330 cc. per minute
Rate of propane flow_____ 345 cc. per minute
Temperature of gases before
  mixing_____ Room temperature
                              (approx. 30° C.)
Temperature of reaction tube.       300° C.
Duration of reaction_____ Approx. ½ second The reaction tube was externally heated to maintain the temperature shown. The gases were passed thru the heated zone and after leaving this zone they were immediately chilled by means of a water-cooled condenser. There was obtained as a reaction product a dark liquid which readily dissolved in water with decomposition. The dark liquid reaction product is a polyhydroxy sulfonic acid which is at least partly esterified with sulfate groups. In water this product hydrolyzes to yield a polyhydroxy sulfonic acid.

Example II

Iso-butane and sulfur trioxide were reacted as in Example I. The reaction tube was supplied with both a heating means and a cooling means in order to hold the temperatures within the range desired. The conditions of the areaction were as follows:

SO₃ flow_____cc./min__ 1122
Iso-butane flow _____cc./min__  745
Iso-butane preheating temperature__°C__ 37–52
SO₃ preheating temperature_____°C__ 44–65
Reaction temperature_____°C__ 105–155
Total SO₃ input_____parts by weight__ 5120
Total iso-butane input_____do____ 2455
Total liquid product formed_____do____ 3191
Total solid product obtained_____do____  381

The solid and liquid reaction products were separated. The liquid fraction was a dark brown liquid which is thought to be polyhydroxy sulfonic acids which contain sulfate groups. This fraction was treated with 6000 parts of ice, and the resulting solution was neutralized with barium carbonate, heated to hydrolyze sulfate groups, and then neutralized again with barium carbonate. After the precipitated barium sulfate was removed, the solution was concentrated and then poured into cold methanol to precipitate a barium salt.

By analysis, this product was found to be a mixture of the barium salts of the following polyhydroxy sulfonic acids:

82% $C_8H_{18}O_{11}S_2$ and

18% $C_4H_{10}O_8S_2$

Both chemical tests and infra-red spectra have substantiated the presence of hydroxy groups in the above sulfonic acids.

This barium salt was extremely soluble in water, concentrated sulfuric acid, and polyhydroxylated solvents such as ethylene glycol, propene glycol, and glycerol, and was either slightly soluble or insoluble in the other organic solvents including monohydroxy alcohols.

The solid reaction product was insoluble in cold water, but dissolved in cold dilute alkali, cold aqueous ammonia, and in boiling water. This solid contained a very high proportion of sulfur and oxygen; carbon, sulfur, and oxygen being present in gram-atomic ratios of 4C:3S:13O. Upon acidic hydrolysis, the product liberated 50% by weight of sulfur trioxide as sulfuric acid, indicating a high degree of sulfation of the product by the sulfur trioxide. After the solid material was hydrolyzed in acid solution, treatment with barium carbonate led to a barium salt having the following empirical composition:

$C_9H_{22}S_2O_{13}Ba$

This barium salt was similar in solubilities and other properties to the polyhydroxy sulfonic acids obtained from the liquid product.

*Example III*

Iso-butane was used in a process like that of Example II but with different reaction conditions as shown below. The reaction products were coloed by means of an ice-water condenser and then immediately passed into an aqueous suspension of barium carbonate. The conditions used in this experiment were as follows:

| | |
|---|---|
| SO₃ flow _____cc./min__ | 226 |
| Iso-butane flow _____do____ | 2040 |
| SO₃ preheating temperature_____°C__ | 55 |
| Iso-butane preheating temperature__°C__ | 47-48 |
| Reaction temperature _____°C__ | 60-75 |
| Total SO₃ input_____parts by weight | 246 |
| Total iso-butane input_____do____ | 1610 |

A large excess of iso-butane was used.

The excess of barium carbonate used was removed and the resulting solution was heated to hydrolyze sulfate groups. Since the solution turned acid during hydrolysis, it was again neutralized with barium carbonate, and the precipitated barium sulfate was removed. After concentrating, the solution was poured into cold methanol, precipitating a product of this invention. The material thus isolated was the barium salt of a mixture of two polyhydroxy sulfonic acids present in the following ratios:

27% $C_4H_{10}SO_6$
73% $C_4H_{10}S_2O_8$

*Example IV*

A process like that of Example I was carried out using n-butane instead of propane. The n-butane was not as reactive as iso-butane, but more reactive than propane. The conditions of the reaction were as follows:

| | |
|---|---|
| SO₃ preheating temperature _____ | 210-215° C. |
| n-Butane preheating temperature _____ | 158-163° C. |
| Reaction temperature (heat supplied) _____ | 140° C. |
| SO₃ flow_____ | 1142 cc. per min. |
| Total SO₃ input_____ | 2838 parts by wt. |
| SO₃ passing through unreacted _____ | 592 parts by wt. (20.8% of input) |
| SO₃ converted to SO₂ by reaction _____ | 490 parts by wt. (17.3% of input) |
| SO₃ combined with n-butane _____ | 1756 parts by wt. (61.9% of input) |
| n-Butane flow _____ | 745 cc. per minute |
| Total n-butane input_____ | 1285 parts by wt. |
| n-Butane reacting with SO₃ _____ | 555 parts by wt. (43.2% of input) |
| Total liquid product formed _____ | 2311 parts by weight (1756 parts coming from SO₃ and 555 parts coming from n-butane) |
| Total water-soluble barium salt isolated _____ | 350 parts |

Only a liquid reaction product was formed with n-butane, in contrast to the iso-butane, where both liquid and solid reaction products were obtained. The liquid formed in the n-butane-sulfur trioxide reaction contained sulfonic acid groups, sulfate groups, and minor quantities of carboxy and carbonyl groups. The product was treated with three times its weight of ice and the resulting solution was heated to hydrolyze sulfate groups. After neutralization and removal of the barium sulfate, the solution was cooled to crystallize out minor quantities of barium methane disulfonate, leaving a solution of a very water-soluble barium salt.

Analytical data on the latter showed that this product contained barium salts of the following acids:

31% $C_4H_8SO_7$ and

69% $C_4H_{10}S_2O_8$

While numerous illustrative processes and compositions have been shown, it will be understood that without departing from the spirit of this invention one skilled in the art may readily device numerous processes for effecting the vapor phase reaction of paraffin hydrocarbons with sulfur trioxide and to produce numerous novel products.

I claim:

1. In a process for the reaction of a paraffin hydrocarbon with sulfur trioxide, the step comprising reacting a paraffin hydrocarbon having at least three carbon atoms with sulfur trioxide in the vapor phase.

2. In a process for the reaction of a paraffin hydrocarbon with sulfur trioxide, the step comprising reacting isobutane with sulfur trioxide in the vapor phase.

3. In a process for the reaction of a paraffin hydrocarbon with sulfur trioxide, the step comprising reacting n-butane with sulfur trioxide in the vapor phase.

4. In a process for the reaction of a paraffin hydrocarbon with sulfur trioxide, the step comprising reacting propane with sulfur trioxide in the vapor phase.

5. In a process for the reaction of a paraffin hydrocarbon with sulfur trioxide, the steps comprising leading a vaporized paraffin hydrocarbon having at least three carbon atoms and vaporized sulfur tioxide into a reaction zone, effecting reaction, and withdrawing a reaction product from the reaction zone.

6. In a process for the reaction of a paraffin hydrocarbon with sulfur trioxide, the steps comprising leading a vaporized paraffin hydrocarbon having at least three carbon atoms and vaporized sulfur trioxide into a reaction zone, effecting reaction withdrawing a reaction product from the reaction zone, and hydrolyzing the product.

7. An aliphatic polyhydroxy sulfonic acid containing sulfone groups, the product being obtained by hydrolyzing the product of the vapor phase reaction of a paraffin hydrocarbon with sulfur trioxide.

8. An aliphatic polyhydroxy sulfonic acid containing sulfone groups, the product being obtained by hydrolyzing the product of the vapor phase reaction of isobutane with sulfur trioxide.

9. An aliphatic polyhydroxy sulfonic acid containing sulfone groups, the product being obtained by hydrolyzing the product of the vapor phase reaction of n-butane with sulfur trioxide.

10. An aliphatic polyhydroxy sulfonic acid containing sulfone groups, the product being obtained by hydrolyzing the product of the vapor phase reaction of propane with sulfur trioxide.

MICHAEL SVEDA.